(12) United States Patent
Shechterman

(10) Patent No.: US 7,463,394 B2
(45) Date of Patent: Dec. 9, 2008

(54) LINEAR OPTICAL SCANNER

(76) Inventor: Mark Shechterman, 238, Dvoranit Str., Nes-Ziona (IL) 74205

( * ) Notice: Subject to any disclaimer, the term of this patent is extended or adjusted under 35 U.S.C. 154(b) by 10 days.

(21) Appl. No.: 11/444,352

(22) Filed: Jun. 1, 2006

(65) Prior Publication Data

US 2007/0279721 A1    Dec. 6, 2007

(51) Int. Cl.
*G02B 26/08* (2006.01)
*G02B 5/04* (2006.01)

(52) U.S. Cl. ................ 359/211; 359/836

(58) Field of Classification Search ........ 359/209, 359/211, 836
See application file for complete search history.

(56) References Cited

U.S. PATENT DOCUMENTS

| 3,614,212 | A | * | 10/1971 | Hock | 359/202 |
| 3,881,802 | A | * | 5/1975 | Helava | 359/211 |
| 4,171,870 | A | * | 10/1979 | Bruning et al. | 359/487 |
| 4,544,228 | A | * | 10/1985 | Rando | 359/211 |
| 4,984,892 | A | * | 1/1991 | Hofmann | 356/625 |
| 5,072,313 | A | * | 12/1991 | Schweitzer et al. | 359/529 |
| 5,917,655 | A | * | 6/1999 | Lehnen et al. | 359/625 |
| 6,429,423 | B1 | * | 8/2002 | Friedland et al. | 250/234 |
| 6,927,916 | B2 | * | 8/2005 | Craven-Bartle | 359/618 |
| 2003/0133391 | A1 | * | 7/2003 | Holtslag et al. | 369/94 |
| 2006/0007568 | A1 | * | 1/2006 | Hendriks et al. | 359/834 |

FOREIGN PATENT DOCUMENTS

| EP | 1050772 | 8/2000 |
| IL | 129738 | 1/2003 |

* cited by examiner

*Primary Examiner*—Stephone B. Allen
*Assistant Examiner*—Jade Callaway

(57) ABSTRACT

A device for linear scanning includes a roof prism. The roof prism includes a roof of two mutually perpendicular reflecting surfaces intersecting in a line of intersection. A scanning mechanism moves the roof prism in a direction perpendicular to a plane of bilateral symmetry. The line of intersection is included in the plane of bilateral symmetry; and an incident beam entering the prism and an exit beam exiting the prism are angularly separated by a substantial angle. Preferably, the scanning mechanism generates periodic motion or rotational motion of the roof prism with a radius of motion greater than a dimension of the roof prism.

15 Claims, 13 Drawing Sheets

LINEAR OPTICAL SCANNER

FIELD AND BACKGROUND OF THE INVENTION

The present invention relates to an optical scanning device; more particularly, to a device in which scanning is performed by reciprocating linear or continuous rotary movement of a ray-deflecting element.

Optical scanning is well-known in which an image produced by an optical system is moved across an image plane typically including a photodetector. Optical scanning has many civilian as well as military uses. Present optical scanners include galvanometer-based devices. In the galvanometer based devices, the scanning movement is produced by a beam-deflecting element such as a flat mirror, which is angularly deflected, oscillating about an axis perpendicular to the optical axis by a galvanometer-type drive (e.g. moving-coil, moving-magnet drive). In these scanners, also known as galvo-based scanners, the oscillating mirror usually constitutes a pupil of the optical scanning system. Consequently there is substantial beam excursion across the system aperture, causing optical aberrations such as coma, distortion and field curvature. Therefore, these optical systems usually are substantially larger than diameters of scanned beams and are complex in order reduce the different optical aberrations. To compensate for these aberrations one or more of the following is required: an additional optical element, such as an F-θ (theta) objective lens or a flattening lens; an axial movement of imaging lens for field curvature compensation and non-linear scanning. An F-theta lens satisfies the condition that the image height equals the product of the focal length of the objective and the scanning angle θ (theta). A flattening lens is usually located close to the scanned plane and corrects field curvature relative to the required flat field. These optical systems typically require several aspherical surfaces (increasing cost) and provide at best no more than average resolution. A second known disadvantage of the galvo-based scanners is the relatively large mass, especially for large beam diameters, and, consequently, large inertia of the oscillating system, which, especially with wide beams, strictly limits the scanning frequency. Owing to the fact that scanning mirror mass is directly proportional to the cube of aperture, effective scanning can be performed only at small apertures. Therefore, additional optical systems (telescopes for infinite conjugate and lens systems for finite conjugate) are usually utilized for transforming large apertures of incident beams into narrow parallel beams for purposes of angular scanning.

Rotating reflecting polygons are usually utilized for continuous light beam scanning. The use of polygons has an advantage of high angular scanning velocity. However, as in galvanometer-based scanning, there is the substantial beam excursion across the system aperture, since the rotating mirror usually constitutes a pupil of the optical scanning system. Therefore, these optical systems usually are substantially larger than diameters of scanned beams, even more than galvanometric-based scanning systems, and complicated for purposes of different optical aberrations compensation (e.g. spherical aberration, coma, distortion, field curvature aberration). Additional drawbacks of polygon-based scanning systems are low scanning efficiency and pupil's wandering, both due to polygon geometry.

U.S. Pat. No. 6,429,423 discloses a device for optical scanning, including a Porro prism or equivalent intersecting mirrors whereby an incident beam of light undergoes two reflections, and an optical system i.e. an objective capable of forming an image of an object. An optical axis, passing through a Porro prism, is rotated by 180° and exits in the opposite direction offset from its entrance point. The two reflections cause two ninety degree folds of the optical axis so that the incident and exit optical axes are parallel (or collinear) on the same side of the Porro prism. An additional optical element is required to unfold at least one of the incident or exit optical axes. Furthermore in order to separate the entrance and exit beams a relatively long optical path is required inside the Porro prism, hence a Porro prism does not support a large numerical aperture.

There is thus a need for, and it would be highly advantageous, to have an optical scanner which overcomes the disadvantages of prior art optical scanners and specifically an optical scanner in which the optical path is small allowing high numerical aperture with small optical elements and without additional optical elements required to separate the incident and exit beams.

The term "pre-objective" scanning system as used herein refers to an optical system in which a scanning element is placed before the focusing objective lens e.g. F-theta scan lens A flat focal plane is preferably obtained at the focus position of the objective lens. The pre-objective scanning system is advantageous in terms of scanning speed, while both scanning field size and spot size are limited heavily by the lens design.

The term "post-objective" scanning system as used herein refers to an optical system in which a scanning element is placed after the focusing lens. The post-objective optical scanner employs a focusing lens typically having a simple design, however the point of focus, in general, is on a curved surface. Accordingly, the curvature of image must be corrected when the post-objective optical scanner is employed.

The term "telecentric" or "telecentricity" as used herein is a property of certain multi-element lens designs in which the chief rays for all points across the object or image are collimated. For example, telecentricity occurs when the chief rays are parallel to the optical axis, in object and/or image space. Another way of describing telecentricity is to state that the entrance pupil and/or exit pupil of the system is located at infinity.

The term "numerical aperture" referring to a lens or an optical system as used herein is $n \cdot \sin \theta$, where n is index of refraction of the medium and $\theta$ is the half-angle of the maximum cone of light that can enter or exit the lens. In general, $\theta$ is the angle of the real marginal ray in the system. The term "high numerical aperture" as used herein refers to a numerical aperture greater than 0.4 or greater than 0.5.

The term "angularly separated" is used herein as follows referring to entrance and exit beams to a prism or optical system. An entrance beam and an exit beam are "angularly separated" when the incident beam to the roof prism and the exit beam from the roof prism are not parallel or if parallel the entrance beam and exit beam are on different sides of the roof prism. The term "parallel" as used herein includes "anti-parallel" or 180 degree rotation. Angularly separated by a "substantial angle" refers to an exit beam angularly separated from the exit beam by ±30 to 90 degrees.

The term "roof prism" as used herein refers to a prism including a roof or two reflecting faces, the two reflecting faces mutually perpendicular or intersecting at ninety degrees, wherein the incident beam to the roof prism and the exit beam from the roof prism are not parallel or, if parallel, the entrance beam and exit beam are on different sides of the roof prism or the incident beam to the roof prism and the exit beam from the roof prism are angularly separated by a substantial angle. A Porro prism used in U.S. Pat. No. 6,429,423 is not a "roof prism" as used herein, because the incident and exit beams to a Porro prism are parallel (rotated by 180 degrees) and are on the same side of the Porro prism.

The term "dimension" of a roof prism as used herein is substantially equal to the length of the optical path within the roof prism.

The term "plane of symmetry" as used herein referring to a roof prism is a plane of bilateral symmetry including the line of intersection of the two reflecting faces forming the roof of the prism. The "plane of symmetry" is equivalent to or coplanar with the plane formed by the incident and exiting optical axes.

The term "multi-dimensional scanning" as used herein includes linear scanning in more than one dimension, particularly linear scanning over area and volume. The term "lateral" as in "lateral direction" of scanning as used herein refers to scanning in a plane (such as in x and y Cartesian directions) and the term "longitudinal" as in "longitudinal" direction refers to scanning (such as in the z Cartesian direction) perpendicular to the plane of lateral scanning.

The terms "incident" and "entrance" are used herein interchangeably when referring to a beam entering an optical system.

SUMMARY OF THE INVENTION

According to the present invention there is provided a device for linear scanning including a roof prism. The roof prism includes a roof including two mutually perpendicular reflecting surfaces intersecting in a line of intersection. A scanning mechanism moves the roof prism in a direction perpendicular to a plane of bilateral symmetry of the roof prism. The line of intersection is included in the plane of bilateral symmetry; and an incident beam entering the roof prism and an exit beam exiting the roof prism are angularly separated by a substantial angle. Preferably, the scanning mechanism generates periodic motion or rotational motion of the roof prism with a radius of motion greater than a dimension of the roof prism. The roof prism is preferably one of multiple roof prisms mounted on a disk and the scanning mechanism rotates the disk about the center of the disk. The radius of the disk is much greater than a dimension of the roof prism. Preferably, the roof prism is an Amici roof prism or one of Abbe Type A, Abbe Type B, Leman, Penta, Shmidt, Frankford Arsenal prisms, Delta, Pechan, and Abbe-Koenig. Preferably, a second roof prism is oriented perpendicularly to the roof prism and the plane of bilateral symmetry of the second roof prism is perpendicular to the plane of bilateral symmetry of the first roof prism. A second scanning mechanism moves the second roof prism in a direction perpendicular to the plane of bilateral symmetry of the second roof prism, and motion of the first roof prism and the motion of the second roof prism are perpendicular. An objective lens preferably of high numerical aperture images a source, and the roof prism is located between the objective lens and an image. Preferably, a relay lens relays the image to a second image and the objective lens or the relay lens is telecentric. Preferably, an intermediate image is located between first and second roof prisms. Preferably, the numerical aperture is greater than 0.3 and the roof prism has a dimension of less than ten millimeters. Preferably, the objective lens is part of an optical system which includes a z-scan mechanism which is used to modify focusing depth of the optical system. Preferably, the z-scan mechanism moves at least one lens of the optical system along an incident optical axis. Preferably, a transparent optical medium is depth scanned in the z direction by using the z-scan mechanism. When the transparent optical medium causes significant spherical aberration the optical system is optimized to cancel the spherical aberration for the entire range of transparent optical medium depth.

According to the present invention there is provided, a method for multi-dimensional linear scanning, using a multiple roof prisms located between an object and an image plane; the roof prisms are linearly scanned in respective lateral directions perpendicular to respective planes of symmetry in the roof prisms causing a point in the image plane to move substantially in the respective lateral directions. Preferably, the image plane is moved longitudinally for scanning in the longitudinal direction.

According the present invention there is provided an item scanned and/or a scan report, according the methods disclosed herein.

BRIEF DESCRIPTION OF THE DRAWINGS

The invention is herein described, by way of example only, with reference to the accompanying drawings, wherein like reference numbers are used to refer to like elements in all the drawings unless otherwise indicated.

DESCRIPTION OF THE PREFERRED EMBODIMENTS

Figure 1:
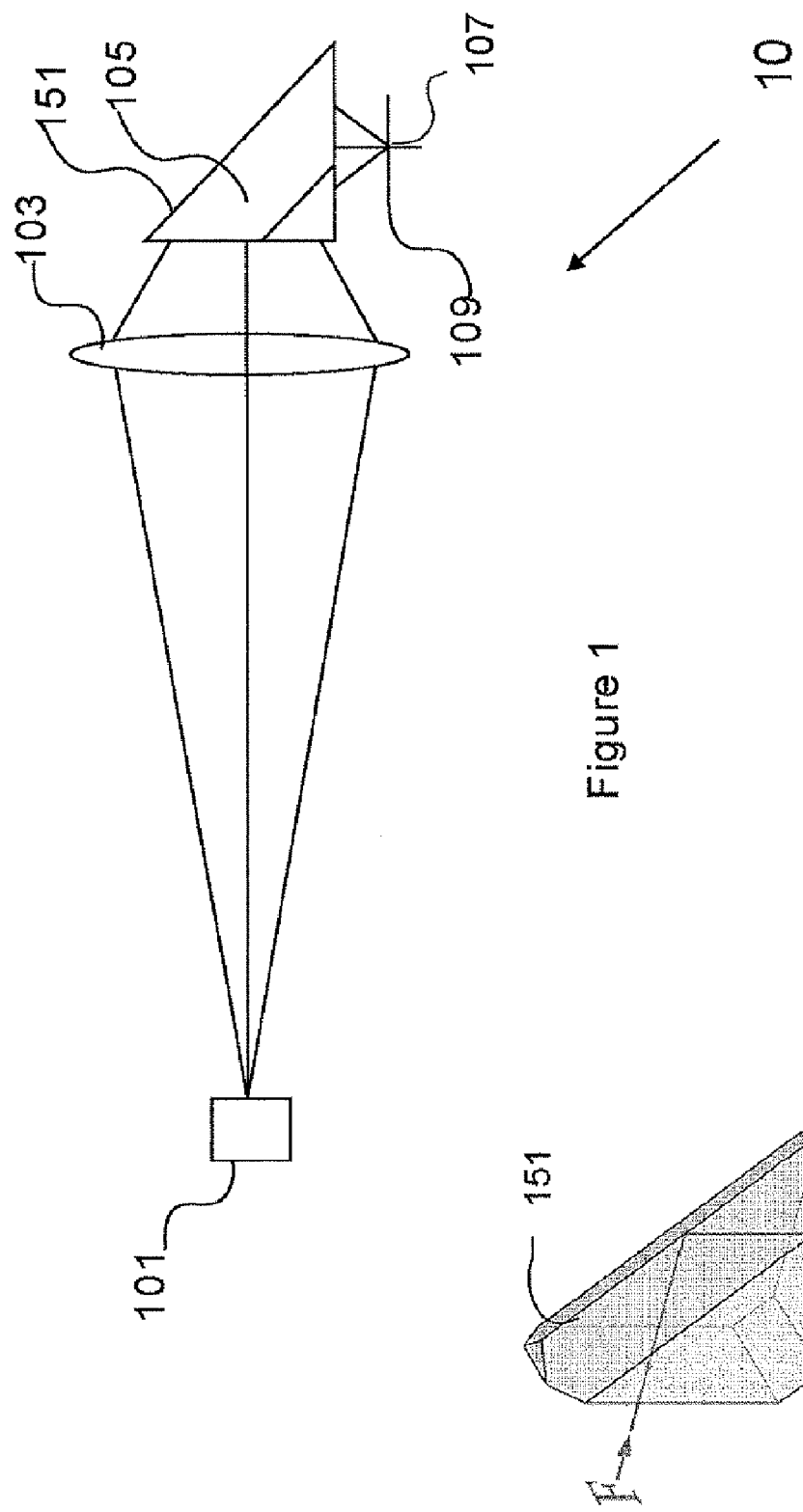
FIG. 1 illustrates a preferred exemplary embodiment 10 of a linear scanner according to the present invention, in front view including an optical system forming an image, and an Amici prism scanning element.

The present invention is of an optical scanning system; more particularly, to a device in which scanning is performed by reciprocating linear or continuous rotary movement of a ray-deflecting element.

The principles and operation of an optical system and method of according to the present invention, may be better understood with reference to the drawings and the accompanying description.

It should be noted that although the drawings herein explicitly illustrate imaging of a light source as an object onto one or more image planes, that the present invention includes embodiments with the direction of the optical rays reversed. Such equivalence results in generating new pre-objective and post-objective embodiments of the present invention.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to: (1) provide in pre-objective linear scanning systems, scanning of the rays from the object in diverging rays is performed by a roof (e.g Amici) prism, perpendicular to the optical axis direction, in close vicinity to the object or to the element for producing light;

(2) provide in post-objective linear scanning systems, scanning of the scene image in converging rays is performed by a roof (e.g Amici type) prism, perpendicular to the optical axis direction, in close vicinity to the image plane or to the light-detecting element for detecting the incident beam of light;

(3) provide, in reciprocating beam-deflecting element, a telecentric objective system. Pre-objective linear scanning performs telecentric ray-tracing in the pre-objective space, and post-objective linear scanning systems perform telecentric ray-tracing in the post-objective space;

(4) provide, in a continuously rotating beam-deflecting element, a substantially telecentric objective system. Pre-objective linear scanning performs telecentric ray-tracing in the pre-objective space, post-objective linear scanning systems performs telecentric ray-tracing in the post-objective space.

Due to a relatively short equivalent optical path through the roof (e.g. Amici) prism, objectives with high numerical aperture is provided, allowing creating of high resolution system.

It should be noted that while the discussion herein is directed to scanning, using an Amici roof prism, the principles of the present invention may be adapted for use with other roof prisms. Most prisms have reflective surfaces, which could be transformed into a "roof" and used according to the teachings of the present invention. Lateral translation of the "roof" (in a direction perpendicular to a plane of symmetry including the roof intersection) shifts the rays on twice distance, exactly as in using an Amici roof prism. Prisms which may be used with a "roof" in different embodiments of the present invention include (but not limited to: Abbe Type A, Abbe Type B, Leman, Penta, Shmidt, Frankford Arsenal prisms, Delta, Pechan, and Abbe-Koenig.

Further the mechanism used to periodically move the scanning prism may be of any such mechanisms known in the art including mechanical, piezoelectric or electromagnetic mechanisms.

The present invention in different embodiments is applicable (but not limited) to: three dimensional microscopy, laser beams deflection and positioning in three dimensions, industrial laser material processing, laser TV, medical and biomedical technology including surgery, optical characters recognition, microlithography, optical switching, printing and inspection, "laser show" and entertainment business. Different embodiments of the present invention may be applied to oscillatory "galvo"-type linear scanning or continuous rotating scanning. Similar different embodiments of the present invention may be applied to both pre-objective and post-objective scanning systems.

Referring now to the drawings, FIG. 1 illustrates a front view of a linear optical scanner 10, according to an embodiment of the present invention. Light source 101 emits light rays which are imaged by an imaging lens 103, through Amici roof prism 105, as scanning element, to focusing point 107 at image plane 109. Reference is now made to FIG. 1a of Amici roof prism 105. Amici roof prism 105 includes a plane of symmetry which includes an intersection 151 between the two roof surfaces. The direction of scanning is perpendicular to the plane of symmetry and parallel to the entrance and exit surfaces of prism 105.

Figure 2:
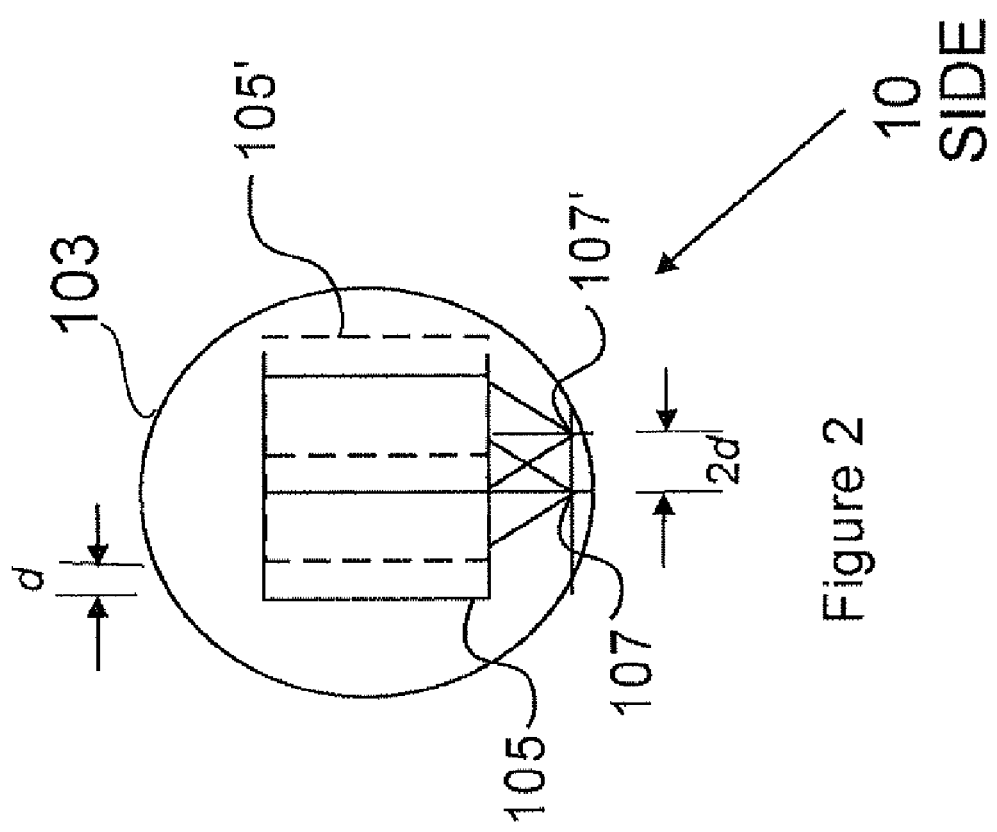
FIG. 2 illustrates embodiment 10 in side view. Linear scanner scans through the optical system, by moving Amici roof prism in a direction perpendicular to the optical axis. Two positions of the prism are shown.

Reference is now made to FIG. 2 which illustrates a side view of optical scanner 10. Lens 103 is shown. When prism 105 is laterally translated along the direction of scanning a distance d, the optical ray path and direction remains unchanged and all rays are shifted parallel to the direction of translation by distance $2d$. Amici prism is denoted by reference numeral 105 in the original position and by 105' after a lateral translation along the direction of scanning. Consequently, initial image is at position 107 and image position shifted by $2d$ is denoted by 107'. Scanning of the image is performed by Amici prism 105, oscillating in the lateral direction.

Figure 3:
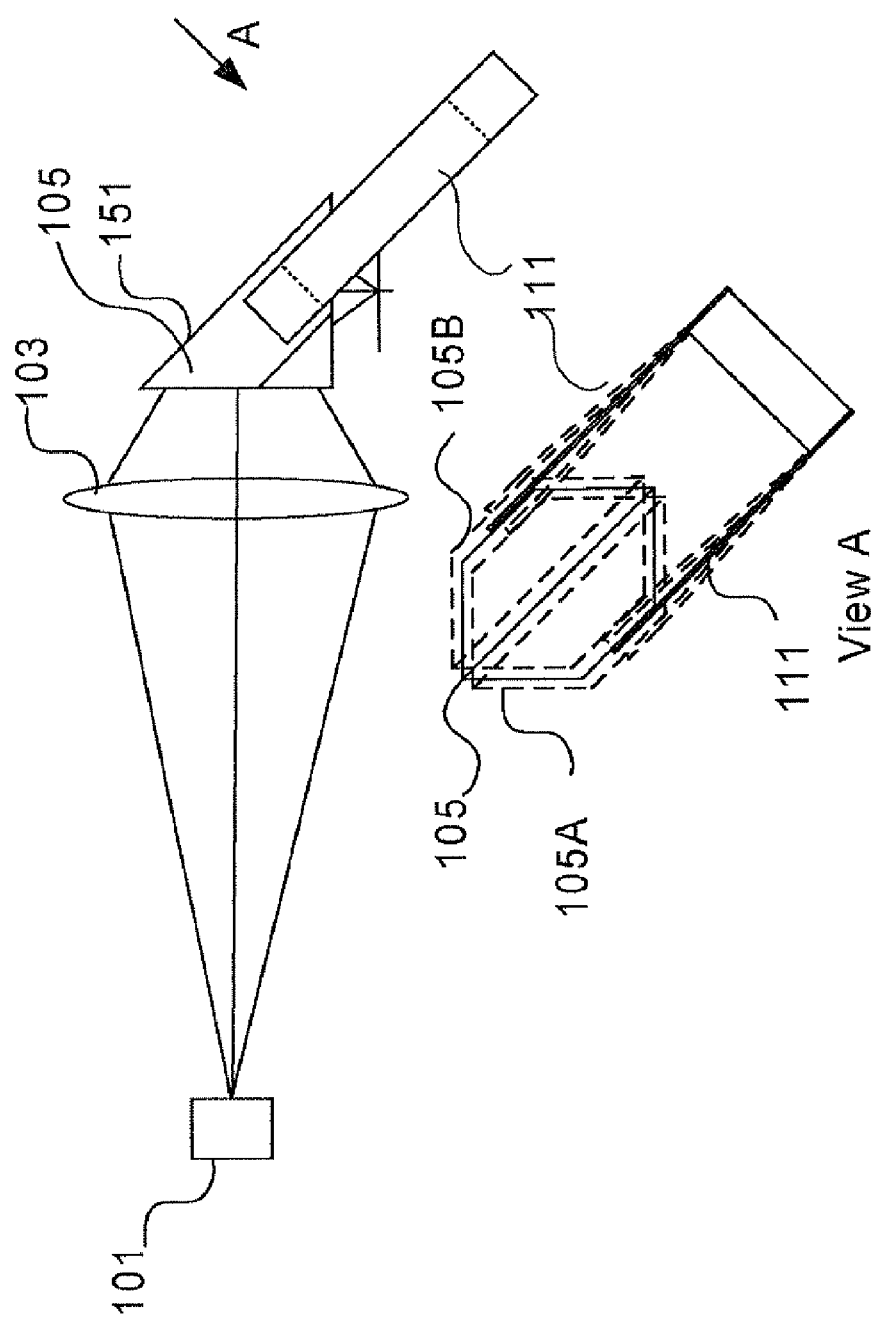
FIG. 3 illustrates a mechanical mechanism for implementing scanner motion in embodiment 10 of the present invention using two flexible members.

Reference is now made to FIG. 3 which illustrates a device, according to an embodiment of the present invention. FIG. 3 illustrates a side view and a view from angle A, labled "View A". Point source 101 emits light rays which are imaged by imaging lens 103, through Amici roof prism 105, as scanning element, to focusing point 107 at image plane 109. Amici prism 105 oscillates parallel to the scanning direction by attaching two flexible members 111 which bend in the direction of scanning. Preferably, flexible members 111 have a principal axis parallel to the Amici roof surfaces intersection 151. Amici prism in initial position of the prism is denoted by reference numeral 105, while 105A and 105B denote two extreme positions of the oscillating Amici prism. Parallel translation is achieved due to equal deformation of flexible members 111.

Figure 4:
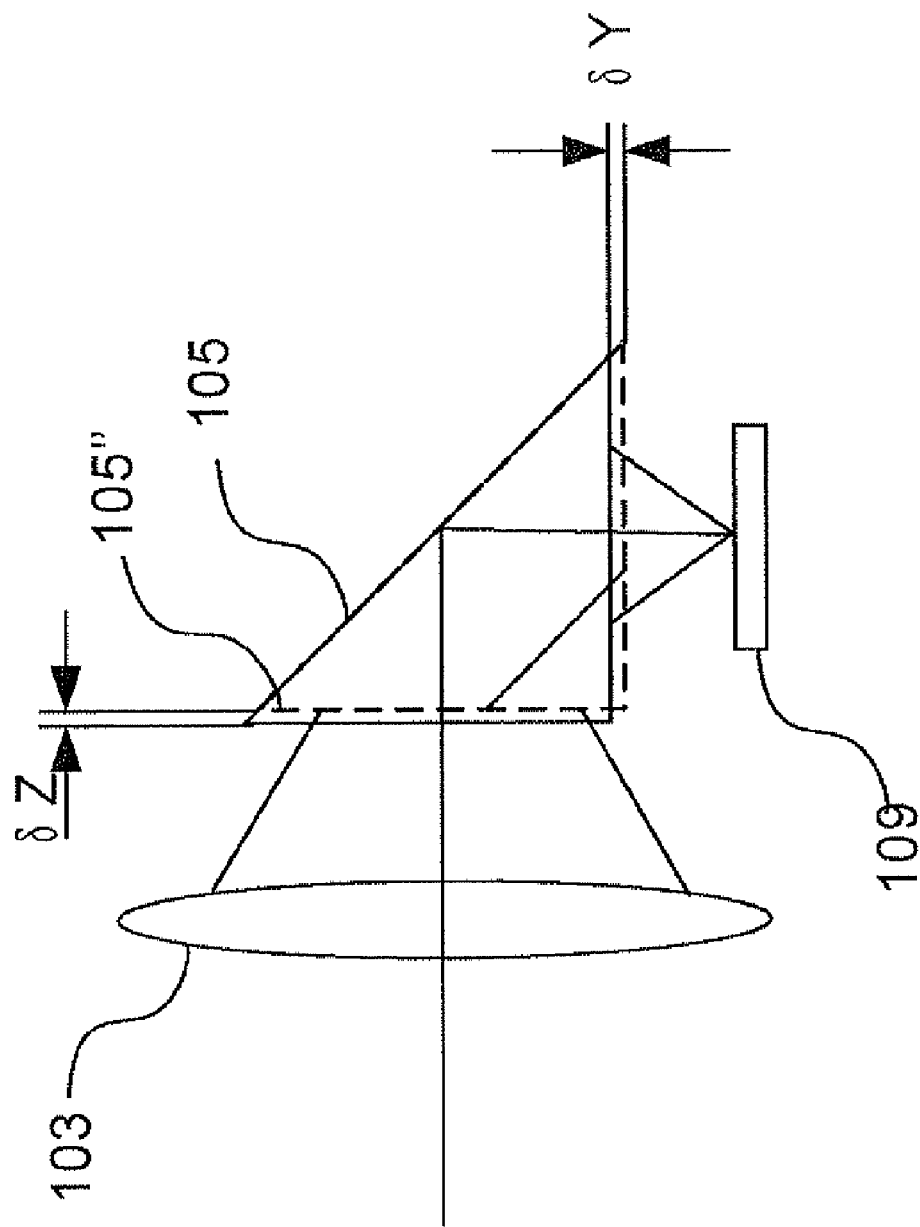
FIG. 4 illustrates shifting of the Amici prism during scanning according to FIG. 3.

Reference is now made to FIG. 4 which illustrates in more detail the optical path though prism 105, shown in cross section, while scanning using the device of FIG. 3, according to an embodiment of the present invention. While oscillating, according to the method illustrated in FIG. 3, prism 105 performs a slight shift to position 105", the shift perpendicular to the scanning direction and parallel to the roof intersection 151. However, as illustrated in FIG. 4, the optical path inside Amici prism 105 does not change, due to equal and opposite changes of respective optical paths at entrance to prism 105 and at exit from the prism, i.e. $\delta z = \delta y$.

Figure 5:
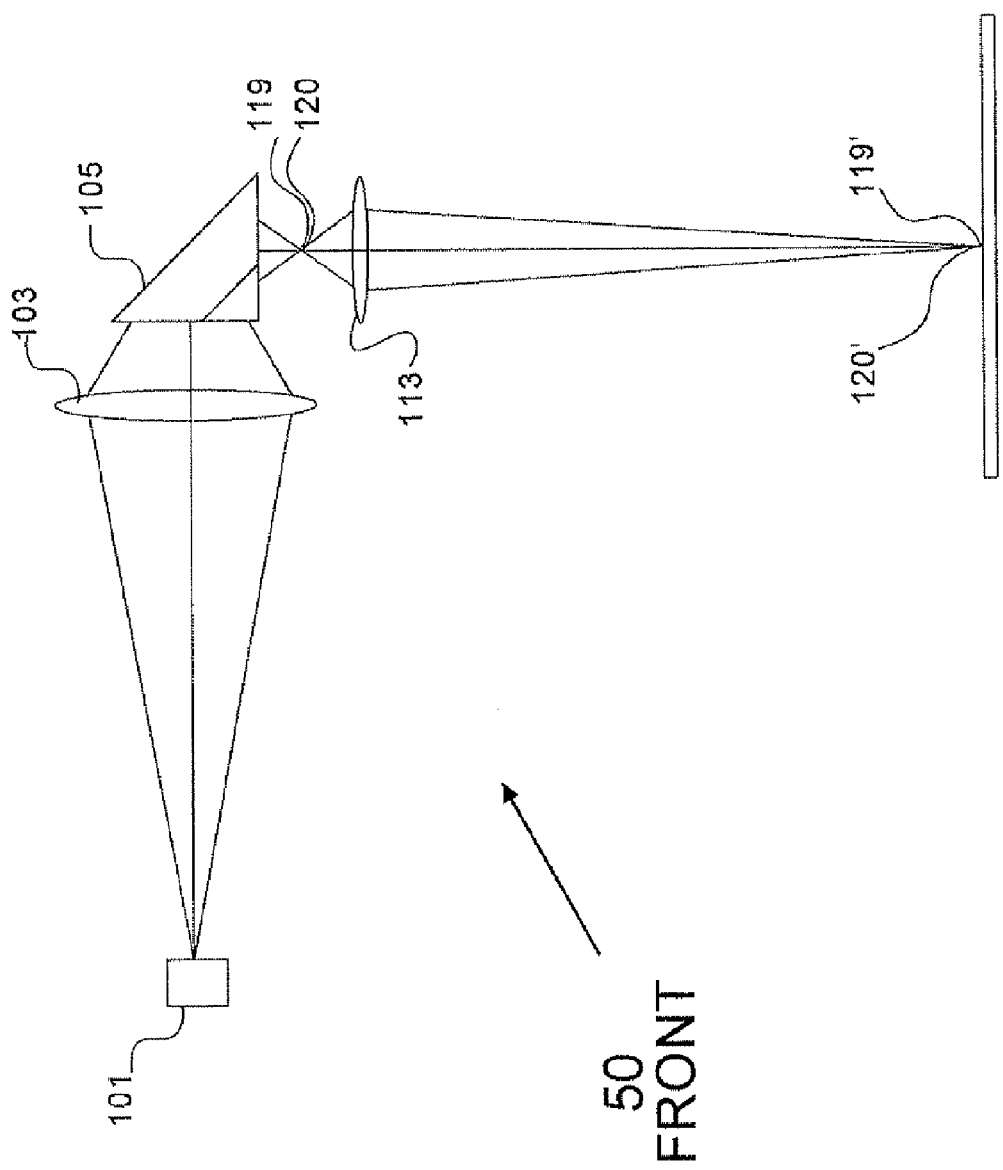
FIG. 5 presents another embodiment 50 of the present invention with a scanning element and relay lens. The relay lens performs additional imaging of the scanned intermediate image plane.
Figure 6:
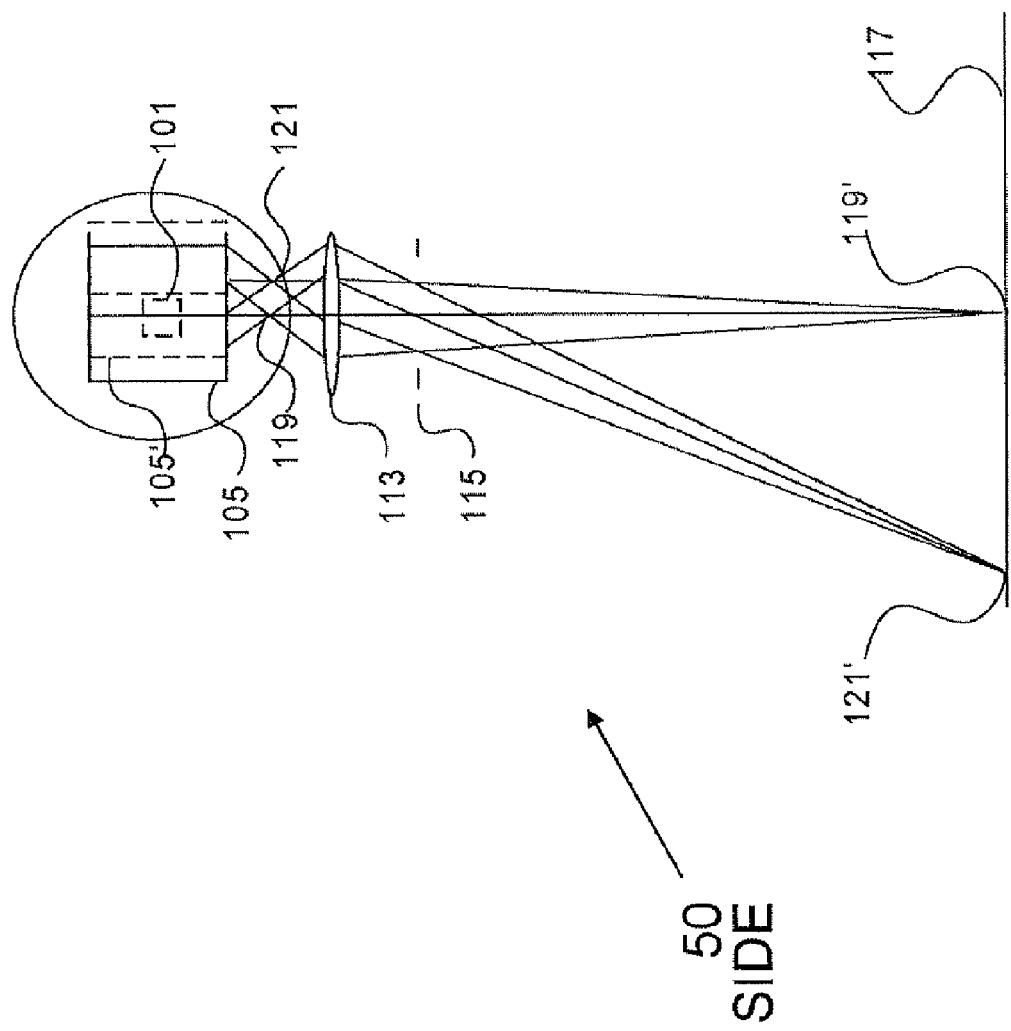
FIG. 6 presents side view on embodiment 50 with one scanning element and telecentrical relay lens between lateral scanning element and relay lens. The pupil of telecentrical relay lens is positioned at the back focal plane of the relay lens.

Reference is now made to FIG. 5 and 6 which illustrate another embodiment of the present invention. FIGS. 5 and 6, show respectively a front view and a side view of a scanning system 50. Point source 101 emits light rays which are imaged by imaging lens 103, through Amici roof prism 105, as scanning element. An optical relay lens 113, is shown in both views. In the side view illustrated in FIG. 6, optical relay lens 113 reimages an intermediate image 119 of the point source into a final image 119'. Consequently, all point on the scanned line, represented by central point of image 119 and one of extreme points 121, are re-imaged into the line, represented by points 119' and 121'. Relay lens 113 is telecentric because Amici prism 105 during the scanning performs a parallel shift of rays. The exit pupil 115 of lens 113 is positioned at the back focal point of lens 113 and therefore the entrance pupil of lens 113 is located at infinity.

Figure 7:
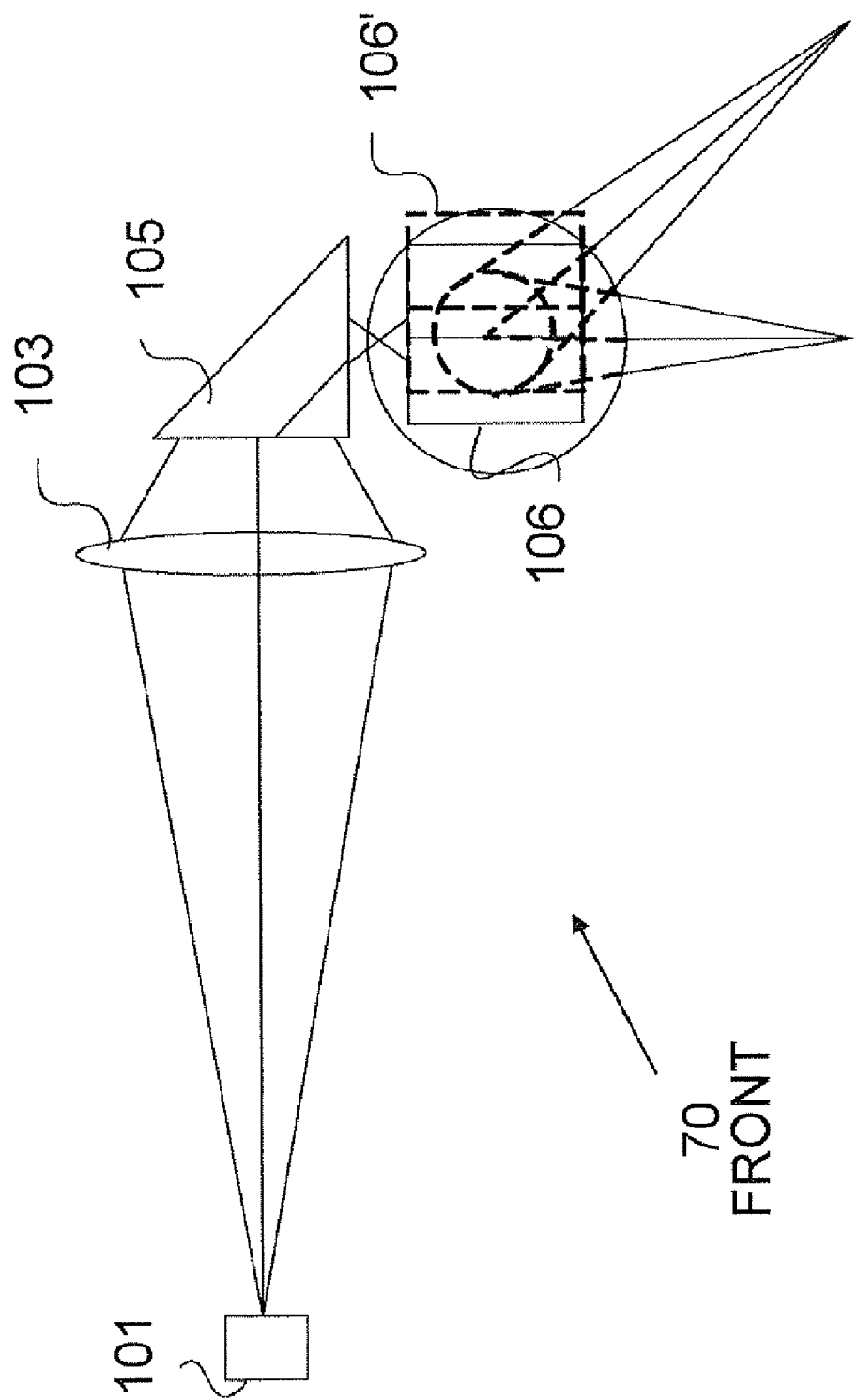
FIG. 7 presents a front view of another embodiment 70 with two scanning elements and relay lens.
Figure 8:
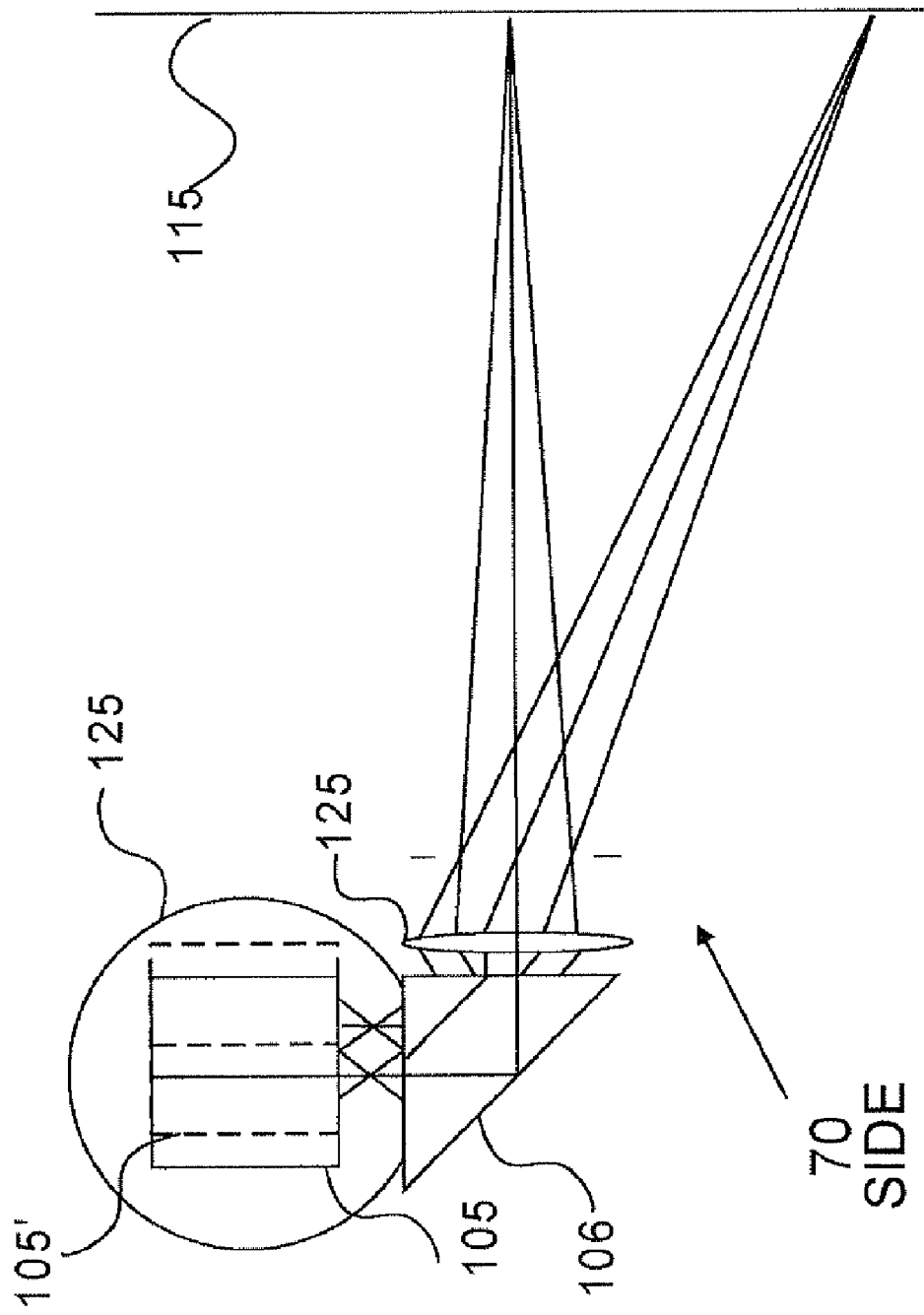
FIG. 8 presents a side view embodiment 70 with two scanning elements and a relay lens. The pupil of telecentrical relay lens is positioned at the back focal plane of the relay lens.

Reference is now made to FIGS. 7 in which an additional embodiment 70, according to the present invention, is illustrated. Point source 101 emits light rays which are imaged by imaging lens 103, through two Amici roof prism 105 and 106, as scanning elements. Reference is now also made to FIG. 8. FIGS. 7 and 8, present respectively front and side orthogonal views of an optical scanning system with two Amici roof prisms 105 and 106 in perpendicular directions. Scanning in horizontal direction is performed, as in previous embodiment 50, by Amici prism 105 and scanning in vertical direction is performed by additional Amici prism 106, thereby allowing scanning in both lateral directions (XY scan). In FIG 7. Amici prism 106 is denoted by reference numeral 106 in the original position and by 106' after a lateral translation along the direction of scanning. In FIG. 8. Amici prism 105 is denoted by reference numeral 105 in the original position and by 105' after a lateral translation along the direction of scanning. Since both scanning prisms 105 and 106 perform a parallel shift of rays, as in previous embodiment 50, optical relay lens 125 is telecentric with exit pupil located at the back focal plane of lens 125.

Figure 9:
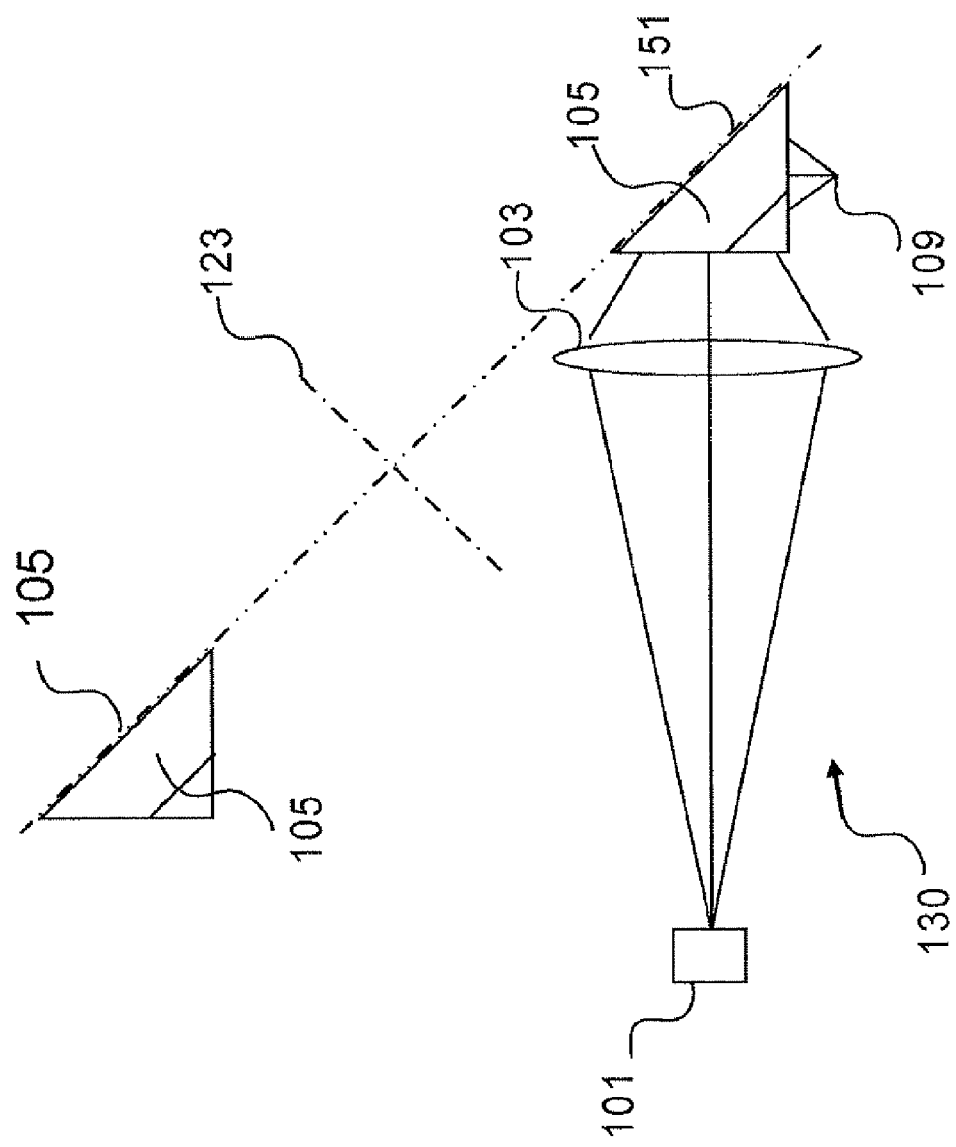
FIG. 9 presents another embodiment 130 with multiple continuously rotating Amici prisms.
Figure 10:
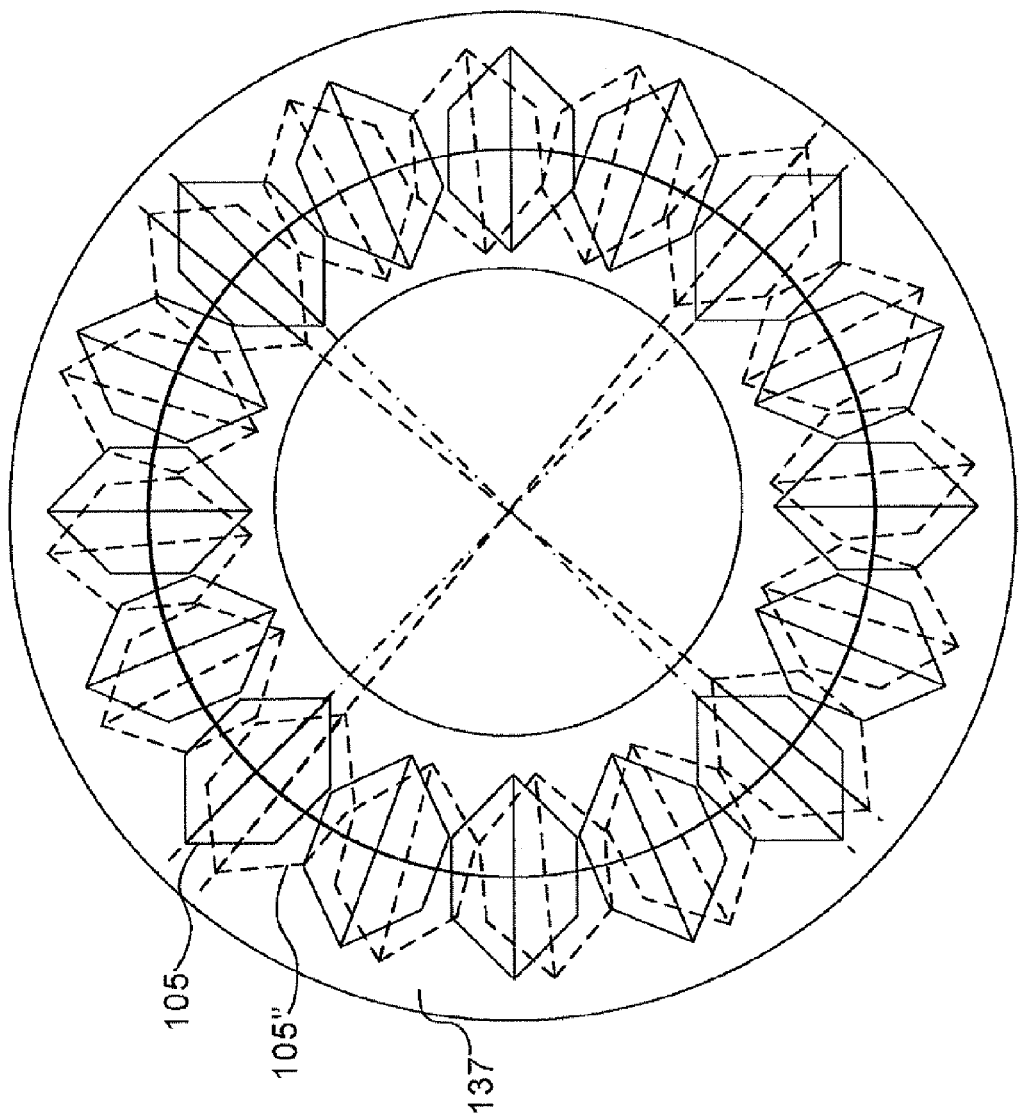
FIG. 10 presents upper view of multiple rotating Amici prisms according to embodiment 130.

Reference is now made to FIG. 9 which illustrates another embodiment 130 of the present invention. Point source 101 emits light rays which are by imaging lens 103, through Amici roof prism 105, as scanning element. Two Amici prisms 105, are shown in FIG. 9 rotating about rotation axis 123 in a plane parallel to roof reflecting surface intersection 151. The rotation is similar to the oscillation, according to embodiment 10 of FIG. 1, and image 109 of point source 101 undergoes nearly a straight line trajectory. Shape of this trajectory can be varied by change of rotation axis position 123 relative to the rest of the projection optical system. Comparing embodiment 130 to state of the art mirror "polygon" mirrors, a much higher optical resolution of image 109 can be achieved owing to much higher numerical aperture of the beam than is practically achievable using polygon scanners. FIG. 10 presents circular arrangement of multiple Amici prisms in position 105, and another position 105" on a rotating mechanical bearing disk 137 rotating about axis 123 as in embodiment 130. High rotating speed of such a disc with a large number of scanning Amici prisms, allows creating of enormous number of pixels, much more than can be supplied for instant by state of art polygon "mirrors.

FIG. 10 presents circular arrangement of multiple Amici prisms in position 105, and another position 105" on a rotating mechanical bearing disk 137 rotating about axis 123 as in embodiment 130. High rotating speed of such a disc with a large number of scanning Amici prisms, allows creating of enormous number of pixels, much more than can be supplied for instant by state of art polygon "mirrors.

Figure 11:
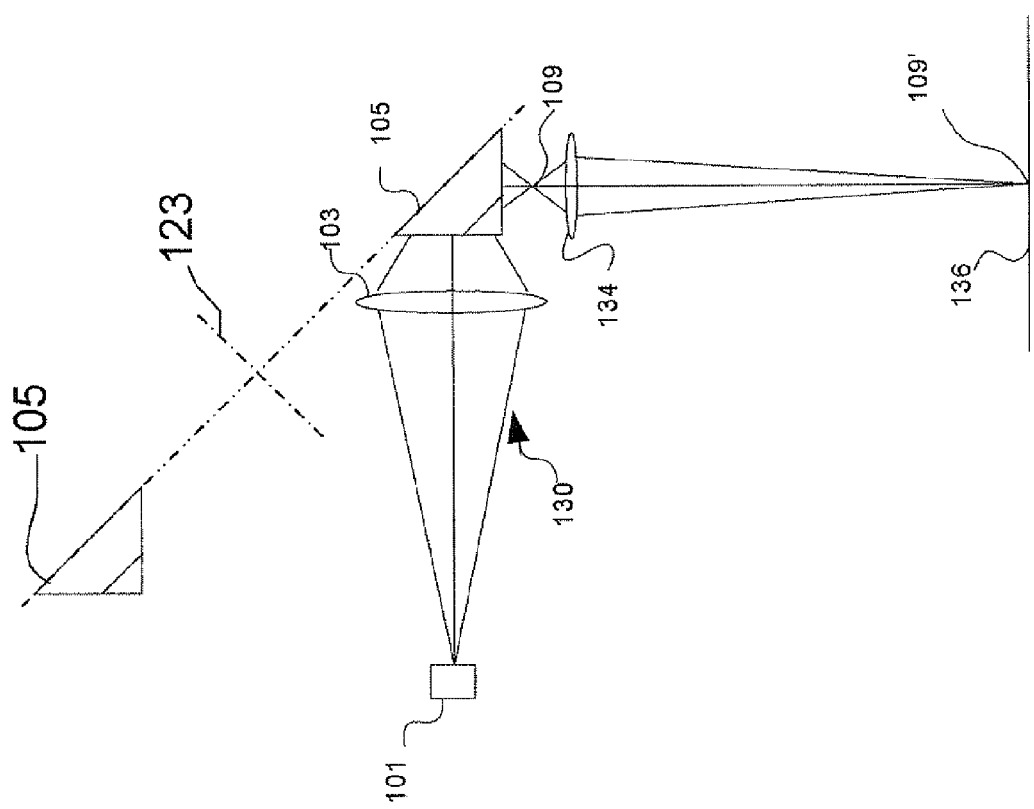
FIG. 11 presents another embodiment of the present invention with multiple scanning Amici prisms and relay lens. The lens performs additional imaging of the scanned intermediate image plane.

Reference is now made to FIG. 11, which illustrates an additional embodiment of the present invention. Point source 101 emits light rays which are imaged by imaging lens 103, through Amici roof prism 105, as scanning element. As presented in FIG. 11, a rotating scanning optical system is shown with Amici prism 105 rotating about axis 123 similar to embodiment 130. An additional optical relay lens 134, performs re-imaging of intermediate image at 109 into final image 109'. As is mentioned above, trajectory of intermediate image 109 could deviate from a straight line. Optical relay 134 performs compensation of intermediate image trajectory deviation from straight line, therefore trajectory of final line will be located on plane 136.

Figure 12:
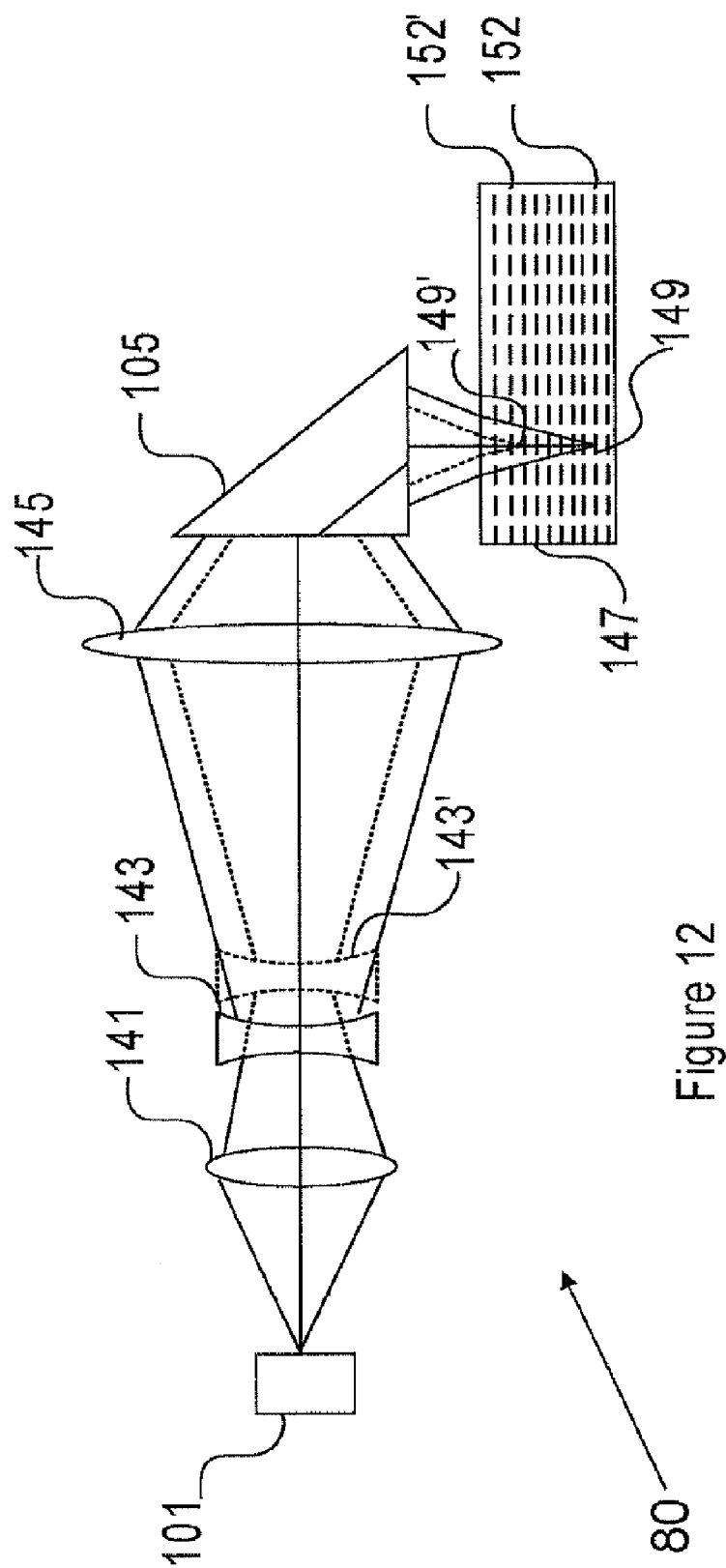
FIG. 12 presents another exemplary embodiment with reciprocal scanning Amici prism, with variable depth of the focused beam inside transparent media.

An additional embodiment 80 of the present invention is illustrated in FIG. 12, of three-dimensional scanning in a transparent medium 147. Three lenses 141, 143 and 145 are used for re-imaging light emitted from illuminating source 101 through Amici roof prism 105, as scanning elements. Lens 143 (shown in two position 143 an 143') is movable along the optical axis, creating a change in depth of focusing plane 149 or z-scan inside the transparent media. The optical system is optimized for compensation of spherical aberration caused by medium 147, at every depth of the focused beam 149 inside the transparent media 147, by pre-calculating of spherical aberration of the optical system at every corresponding axial position of lens 143. Lens 143 axial movement causes change of the focused beam position and scanning in depth is achieved as well as lateral scanning. Spherical aberration of the transparent medium 147 is strongly dependent on the depth of the focusing beam. Entire optical system spherical aberration is equal in magnitude, but opposite in sign, to the spherical aberration caused by penetrating of the beam into optical medium 147 and thus for the whole depth range. So, spherical aberration is balanced or canceled and the scanning in depth is not deteriorated appreciably by medium 147 spherical aberration.

Two discrete positions of lens 143 and 143' are shown in FIG. 12 with corresponding positions of the focused beam 149 and 149' and scanned layers 152 and 152'.

Possible application of embodiment 80 are reading and writing of information in three dimensions. In embodiments of the present invention when F-number is low (or numerical aperture is high) of the scanning optical system, then the depth of focus inside transparent medium 147 is incredibly short. For example, if the optical system has F-number of 1, equivalent depth of focus for air (for $\lambda/4$ wavefront deformation) is $+/-2.44\lambda$, meaning for visible light depth of focus is about $\pm 1.2$ micron. So, layers of information could be written in depth intervals of few microns. The information could be written by means modulation of amplitude, phase, spectrum, etc.

Figure 13:
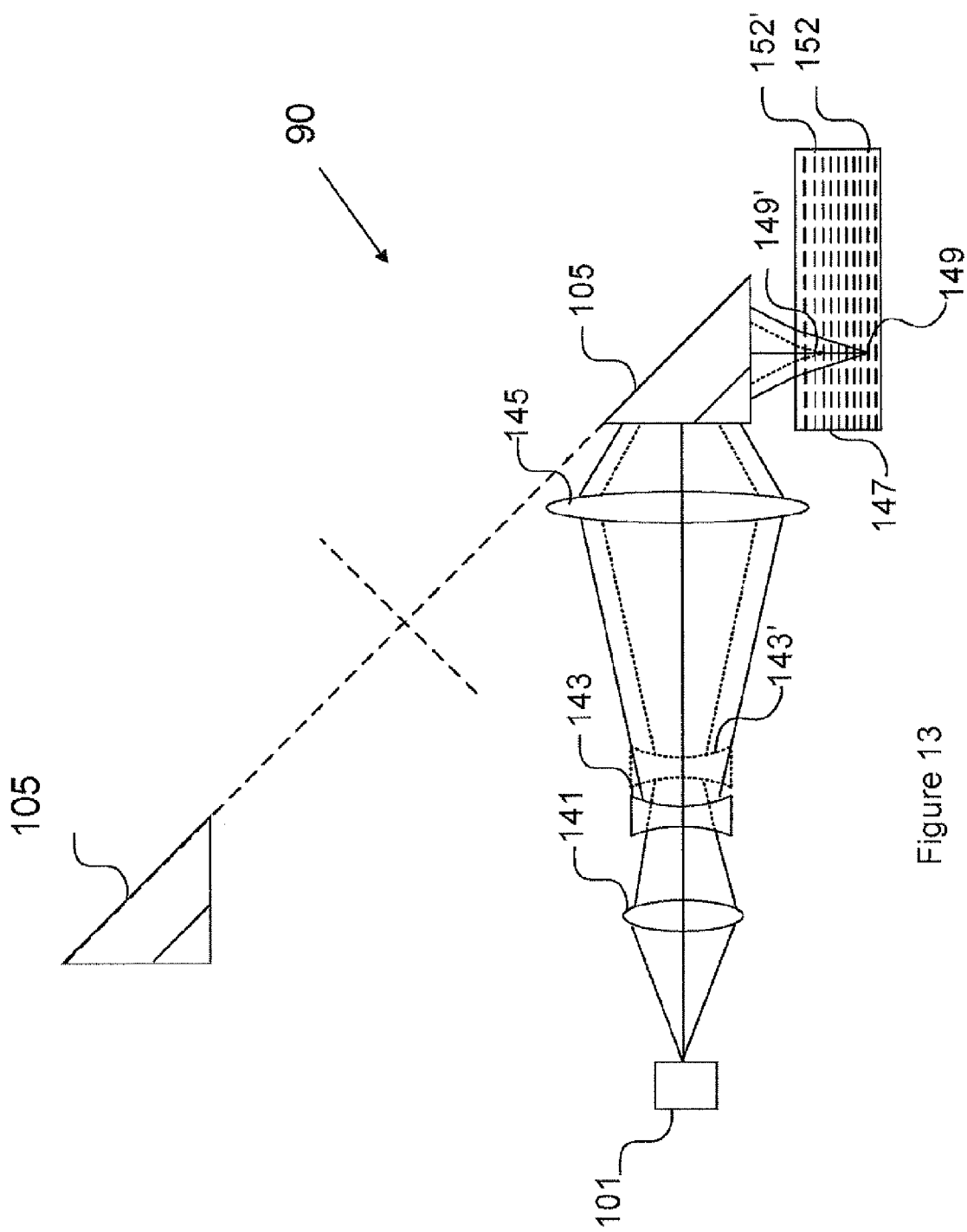
FIG. 13 presents additional patent embodiment with multiple scanning Amici prisms, with variable depth of the focused beam inside transparent media.

FIG. 13 illustrates a new embodiment 90 which combines multiple continuously rotating Amici prisms 105 (embodiment 130) with scanning in depth, combined with embodiment 80 scanning in a three dimensional transparent medium 147. As in embodiment 80, three lenses 141, 143 and 145 are used for re-imaging light emitted from illuminating source 101 through Amici roof prism 105, as scanning element. Lens 143 (shown in two position 143 an 143') is movable along the optical axis, creating a change in dept of focusing plane 149 or z-scan inside the transparent media. Two discrete positions of lens 143 and 143' are shown in FIG. 13 with corresponding positions of the focused beam 149 and 149' and scanned layers 152 and 152'.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A device for linear scanning, comprising:
   (a) a roof prism, wherein said roof prism includes a roof wherein said roof includes two mutually perpendicular reflecting surfaces intersecting in a line of intersection;
   (b) a scanning mechanism which moves said roof prism in a direction substantially perpendicular to a plane of bilateral symmetry, wherein said line of intersection is included in said plane of bilateral symmetry, wherein an incident beam entering said roof prism and an exit beam exiting said roof prism are angularly separated by a substantial angle.

2. The device, according to claim 1, wherein said scanning mechanism generates periodic motion.

3. The device, according to claim 1, wherein said scanning mechanism generates rotational motion of said roof prism with a radius of motion substantially greater than a dimension of said roof prism.

4. The device, according to claim 1, wherein said roof prism is one of a plurality of roof prisms mounted on a disk, wherein said scanning mechanism rotates said disk about the center of said disk, wherein the radius of said disk is substantially greater than a dimension of said roof prism.

5. The device, according to claim 1, wherein said roof prism is an Amici roof prism, wherein said incident beam enters said Amici roof prism and said exit beam exits said Amici roof prism through different optical surfaces of said Amici roof prism.

6. The device, according to claim 1, wherein said roof prism is selected from the group of prisms consisting of: Abbe Type A, Abbe Type B, Leman, Penta, Schmidt, Frankford Arsenal prisms, Delta, Pechan, and Abbe-Koenig.

7. The device, according to claim 1, wherein said roof prism has a plane of bilateral symmetry including said line of intersection, the device further comprising:
   (c) a second roof prism oriented perpendicularly to said roof prism, wherein a second plane of bilateral symmetry of said second roof prism is substantially perpendicular to said plane of bilateral symmetry of said roof prism; and
   (d) a second scanning mechanism which moves said second roof prism in a direction substantially perpendicular to said second plane of bilateral symmetry of said second prism, whereby motion of said roof prism and second motion of said second roof prism are substantially perpendicular.

8. The device, according to claim 1, further comprising:
   (c) an objective lens imaging a source, wherein said roof prism is located between said objective lens and an image, wherein said objective lens is of high numerical aperture.

9. The device, according to claim 8, wherein said numerical aperture is greater than 0.3 and a dimension of said roof prism is less than ten millimeters.

10. The device, according to claim 8, further comprising an optical system, wherein said optical system includes said objective lens, and wherein said optical system further includes a z-scan mechanism which modifies focusing depth of said optical system.

11. The device, according to claim 8, further comprising:
    (d) a relay lens which relays said image to a second image.

12. The device, according to claim 11, wherein at least one lens is telecentric, wherein said at least one lens is selected from the group of said objective lens and said relay lens.

13. The device, according to claim 10, wherein said z-scan mechanism moves at least one lens along an incident optical axis, wherein said at least one lens is included in said optical system.

14. The device, according to claim 10, further comprising a transparent optical medium, wherein said z-scan mechanism is used to scan depth within said transparent optical medium.

15. The device, according to claim 14, wherein said transparent optical medium causes spherical aberration and said optical system is optimized to cancel said spherical aberration.

* * * * *